March 16, 1965  R. STARAI  3,174,072
RECORDING LEVEL INDICATOR AND CIRCUIT
Filed March 16, 1961

INVENTOR.
Rudolph Starai
BY Mueller & Aichele
Attys.

United States Patent Office 3,174,072
Patented Mar. 16, 1965

3,174,072
RECORDING LEVEL INDICATOR AND CIRCUIT
Rudolph Starai, Chicago, Ill., assignor to Motorola, Inc.,
Chicago, Ill., a corporation of Illinois
Filed Mar. 16, 1961, Ser. No. 96,199
9 Claims. (Cl. 315—18)

This invention relates to recording apparatus and more particularly to an electron ray indicator tube and circuit for indicating the amplitude of a recorded signal.

In the design of recording apparatus it is necessary to include some means of measuring and indicating the amplitude of a signal being recorded. Electron ray indicator tubes have been used for this purpose but available tubes have been found to be inadequate under certain circumstances.

One problem is that preamplification is required to indicate small potentials, and to include a separate amplifier involves objectionable cost. In addition, difficulty has been encountered because the shadow image produced by the indicator tube responds almost instantaneously to applied signal amplitude variations. With audio signals, and particularly voice and music signals, this results in variations with the individual cycles so that the shadow images are fuzzy and poorly defined. The average amplitude of an audio signal varies much more slowly than the instantaneous amplitude and the image produced by an average amplitude signal is more sharply defined and readable.

It is therefore an object of this invention to provide an inexpensive and improved device for indicating the amplitude of a signal being recorded.

Another object of this invention is to provide an electron ray indicator tube which provides an indication which varies according to the average amplitude of the audio signal being recorded.

Still another object of this invention is to provide an indicating device which provides a readily recognizable shadow image to indicate recording level by use of a low electrical potential.

A feature of this invention is the provision of an electron ray indicator tube having a target of stepped configuration which provides accurate indication and evaluation of relatively small potential signals.

Another feature of this invention is the provision of a recording level indicator including a diode rectifier and capacitor in a circuit which develops a D.C. voltage which varies according to the average amplitude of the audio signal, and including an amplifier which amplifies the direct current voltage.

A further feature of the invention is the provision of an indicator tube having an amplifier section within the indicator tube, and a circuit coupled to the tube for applying audio signals to the amplifier section and including a detector coupled to the amplifier output and applying the detected signals to the amplifier input for repeated amplification therein and application to the indicator section of the tube.

In practicing the present invention, an indicator tube is provided including a phosphor coated target, mounted in an envelope with a control electrode and a cathode, with the target glowing as a result of electron bombardment from the cathode. A fixed potential is applied between the target and cathode while the signal to be indicated is applied to the control electrode. The variation in width of a shadow area produced on the target is a function of the relative potential of the control electrode. Small potentials require preamplification, and for this reason an amplifier section is included in the envelope. To give a reliable indication of small signals, a step shaped target is used, which more readily indicates low potential signals. The shadow image responds almost instantaneously to applied signal amplitude variations and fast variations from an audio signal produces a poorly defined image. The undesirable condition is obviated by deriving an average voltage from the signal by employing a diode rectifier and a load coupled in the circuit to develop a voltage which varies according to the average amplitude of the audio signal. Reflex action is provided in the circuit by applying the voltage representing the average amplitude back to the amplifying section and both the audio signals and the average voltage are applied to the indicator section of the tube.

Figure 1:
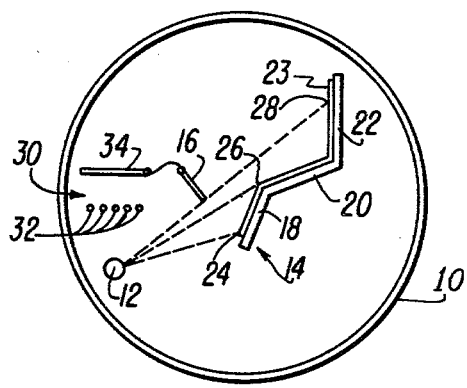
FIG. 1 is a cross-sectional view of an electron ray indicator tube constructed in accordance with the present invention.

Referring particularly to FIG. 1, the electron ray indicator tube constructed in accordance with the present invention comprises an envelope portion 10, an electron emitter or cathode 12, a target 14, and a control electrode 16 disposed adjacent the space between the electron emitter and target. The target is divided into three areas as indicated 18, 20, 22. The target is coated with a phosphor 23 to emit light upon bombardment of electrons from electron emitter 12. The target is an irregular plate angularly disposed in the stream of electrons. The phosphor side of the target emits light beginning at the left edge 24 of the target as shown and proceeding towards point 28 as the potential of the control electrode 16 is made less negative relative to the target. This covers area 18 and any further change in control electrode potential in the same direction results in light emission at point 28, with the area designated by 20 remaining dark. When the control electrode potential equals that of the target, all of the area 22 emits light. The variation in width of this shadow angle is a function of the relative potential of the control electrode. Area 20 is shown exaggerated for clarity and need only be large enough to result in a dark band in the target area.

An amplifying section generally indicated by the reference numeral 30 is contained within the envelope portion 10. This amplifying section includes a grid 32 and a plate 34. The cathode 12 of the indicator section also serves as the cathode for the amplifier section.

Figure 2:
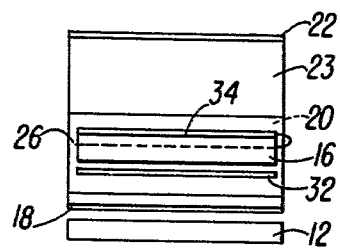
FIG. 2 is a front elevational view of the target, cathode and control electrode of FIG. 1.

FIG. 2 is a face view of the step-shaped target of FIG. 1 comprising the areas 18, 20 and 22, the electron emitter 12 and the control electrode 16. It will be understood that the discontinuity in the image can also be produced on a conventional target by leaving a portion of the area blank or by coating a portion of the target with a phosphor of different characteristics.

Figure 3:
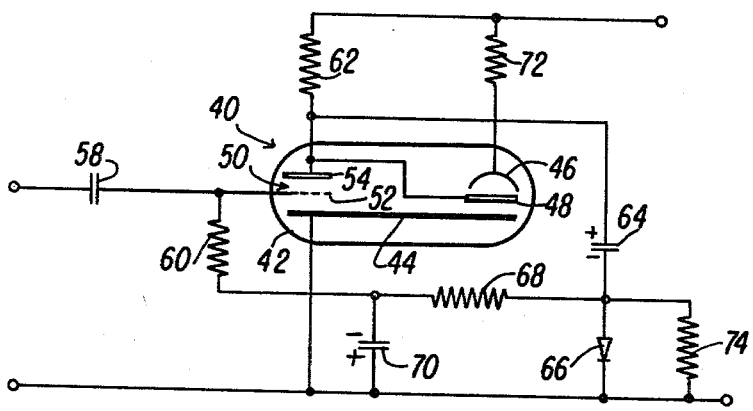
FIG. 3 is a diagrammatic illustration of a recording level indicator circuit showing the electron ray indicator tube schematically.

Referring now to FIG. 3, the recording level indicator circuit generally indicated by the reference numeral 40 includes the electron ray indicator tube as previously described and which has an envelope 42, a cathode 44, a target 46, a control electrode 48, and an amplifying section indicated generally by the reference numeral 50. The amplifying section includes a grid 52 and a plate 54. As shown, an input signal is applied through capacitor 58 to the grid 52. An amplified signal voltage is developed across resistor 62 by the action of the triode amplifier section 50. This amplified signal is coupled through capacitor 64 to diode 66. During positive half cycles of the amplified signal, conduction through diode 66 adds to the charge on capacitor 64 with the polarity shown. During negative half cycles the diode 66 does not conduct and the charge on capacitor 64 provided by the previous half cycle adds to the voltage developed across load resistor 74. This voltage is applied through resistor 68 to capacitor 70 and develops a charge across capacitor 70, with the polarity shown in the figure.

The charge developed across capacitor 70 acts through resistor 60 to bias the grid 52 of the triode amplifier section 50. The biasing voltage is proportional to the average value of the amplified signal appearing across resistor 62. As the biasing voltage applied to the triode grid 52 of amplifier section 50 is increased, the triode amplification is reduced. Resistor 74 completes the grid return through resistors 60 and 68, and discharges capacitor 70 and capacitor 64 when no signal is present. Resistor 68 and capacitor 70 comprise an RC filter which brings the rectified voltage from resistor 74 to the triode grid circuit while filtering out audio signal components which would otherwise feedback and produce degenerations thus reducing the sensitivity of the circuit.

It will be understood that as the triode's amplification is reduced there is poor sensitivity at shadow angles approaching zero degrees. By introducing resistance 72 into the target circuit as shown in FIG. 3, the target potential is reduced to a point where a zero degree shadow angle can be produced by a lesser value of bias voltage on the triode grid 52.

The amplified signal at plate 54 is applied through a connection within the tube to the control electrode 48 of the indicator section. This includes the input signal which has been amplified in the section 50 and the average signal which has been developed across resistor 74 and applied through filter 68, 70 and resistor 60 to the grid 52 and is also amplified in the section 50. The voltage of the control electrode 48 therefore includes a component of the input signal and a component of the average value.

It is apparent from the foregoing description that the invention provides a simple and inexpensive device to measure the potential of a recorded signal. The circuit utilizes the electrical output of an amplifier section to effectively increase the sensitivity of the indicator circuit. The circuit incorporates an electron ray indicator tube which contains an amplifier section in the same envelope with the other electrodes. The target electrode is formed to comprise at least three sections of a configuration directed to provide an indication when a small amount of current is supplied to the triode amplifier which corresponds to zero shadow width on the target. The circuit in addition includes a rectifier circuit to provide a component which varies with the average amplitude, which is combined with the component which varies with the instantaneous amplitude of the signal to provide a more clearly defined indication.

I claim:

1. An electron ray indicator tube to measure the relative potential of a control electrode comprising an envelope portion under vacuum, a target mounted within said envelope portion, said target coated with a phosphor to emit light upon electron bombardment, an electron emitter mounted within said envelope portion in spaced relationship to said target, a control electrode mounted within said envelope portion adjacent the space between said electron emitter and said target and positioned to one side of the electron flow from said electron emitter to said target to control the size of the area on said target which the electrons bombard, means defining a source of fixed potential across said electron emitter and said target, amplifier means within said envelope portion adapted to apply an input signal to said control electrode, and means adapted to feed back a signal proportional to the average amplitude of the output of said amplifier means to the input of said amplifier means, whereby a measurable shadow appears on said target as the potential of said control electrode is made negative with respect to said target.

2. A recording level indicator circuit to measure the amplitude of audio frequency signals derived from a suitable source including in combination, an electron ray indicator tube having an envelope portion under vacuum, a metallic target mounted within said envelope portion, said target coated with a phosphor to emit light upon electron bombardment, electron emitting means disposed within said envelope portion in spaced relationship to said target, a control electrode mounted within said envelope portion adjacent the space between said electron emitter and said target to affect the electron flow from said electron emitter to said target for controlling the area of said target under electron bombardment, amplifying means disposed within said envelope for applying an amplified signal to said control electrode, circuit means adapted to produce a control signal varying according to the average amplitude of the output of said amplifying means, said circuit means comprising a diode rectifier and a capacitor and being connected to said amplifying means to apply said control signal thereto.

3. An audio recording level indicator circuit including in combination, means for indicating the strength of the recorded audio signal including control means for operating the same, amplifier means having input and output conductors with said output conductor connected to said control means, means for applying the audio signal being recorded to said input conductor of said amplifier means, and detector means and rectifier means coupling said output conductor of said amplifier means to said input conductor thereof for feeding back detected and rectified audio signals from said output conductor of said amplifier means, whereby a more stable potential is supplied to said control means for indicating the level of the audio signal applied to said amplifier.

4. A recording level indicator circuit to indicate the amplitude of audio frequency signals derived from a suitable source, including in combination, indicator means having a control electrode therein, an amplifier connected from the source of audio frequency signals to the control electrode for supplying a control voltage thereto, and circuit means for producing a control signal varying according to the average amplitude of the output of said amplifier, said circuit means connected to feed back output signals from said amplifier to the input thereof, whereby a more stable control voltage is supplied to said control electrode.

5. An electron ray indicator tube for indicating the level of a signal, including in combination, an envelope portion under vacuum, electron emitting means mounted within said envelope, a control electrode mounted in said envelope to supply a potential for affecting the direction of travel of electrons emitted by said electron emitting means, and a target mounted within said envelope portion and having means thereon to emit light upon electron bombardment, said target being angularly disposed to the stream of electrons to establish a varying distance of travel therefor, said control electrode being placed to one side only of the stream of electrons on the side of said target closest to said electron emitting means to control the size of the area on said target which the electrons bombard by varying the position of one edge of the area only.

6. An electron ray indicator tube for indicating the level of a signal, including in combination, an envelope portion under vacuum, a target having first and second sides and being mounted within said envelope portion, said target having means on said first side to emit light upon electron bombardment, electron emitting means mounted within said envelope portion in spaced relationship to said target, said target being angularly disposed to the stream of electrons projected from said electron emitting means and having a center portion on said first side with its surface positioned to avoid being bombarded by said stream of electrons, a control electrode mounted within said envelope portion adjacent the space between said target and said electron emitting means and to one side of the stream of electrons to control the size of the area on said target which said electrons bombard, triode amplifying means disposed within said envelope portion, means for applying a signal to said amplifying means, means for applying the signal from said amplifying means to said control electrode, with a first potential at said control electrode causing one end of said target to emit light and a greater potential at said control electrode causing light emission at the other end of said target, and with the center portion remaining dark.

7. An electron ray indicator tube for indicating the level of a signal, including in combination, an envelope under vacuum, a target having first and second sides, said target being mounted within said envelope and having means on said first side to emit light upon electron bombardment, electron emitting means mounted within said envelope in spaced relationship to said target and emitting electrons directed toward said first side of said target, said target having a portion on said first side unresponsive to the electrons emitted by said electron emitting means, whereby said portion of said target appears as a dark band when said means on said target emits light, and a control electrode mounted within said envelope adjacent the space between said target and said electron emitting means, said control electrode being positioned to one side of the flow of electrons to said target to control the size of the area on said target which the electrons impinge.

8. An electron ray indicator tube for indicating the level of a signal, including in combination, an envelope under vacuum, a target having first and second sides, said target being mounted within said envelope and having means on said first side to emit light upon electron bombardment, electron emitting means mounted within said envelope in spaced relationship to said target and emitting electrons toward said first side of said target, said target being angularly disposed in the stream of electrons projected from said electron emitting means and having a center portion on said first side unresponsive to the stream of electrons projected from said electron emitting means, said center portion presenting the appearance of a dark band, and a control electrode mounted within said envelope adjacent the space between said target and said electron emitting means, said control electrode being positioned to one side of the stream of electrons to control the size of the area on said target which the electrons bombard.

9. An audio recording level indicator circuit including in combination, an electron ray indicator tube having an envelope under vacuum, a metallic target mounted within said envelope having a phosphor coating to emit light upon electron bombardment, an electron emitter disposed within said envelope portion in spaced relationship to said target, a control electrode mounted within said envelope between said electron emitter and said target to affect the electron flow from said electron emitter to said target for controlling the area of said target under electron bombardment, an amplifier section included within said envelope connected to said control electrode, said amplifier section having input and output conductors, means for applying audio signals to said amplifier, detector means and rectifier means coupled to said output conductor of said amplifier for applying rectified audio signals from said output conductor to said input conductor of said amplifier for amplification thereof and application to said control electrode, whereby a measurable shadow appears on said target as the potential of said control electrode becomes negative with respect to said target for indicating the level of the audio signal applied to said amplifier.

References Cited in the file of this patent
UNITED STATES PATENTS

| | | |
|---|---|---|
| 2,019,770 | Prinz | Nov. 5, 1935 |
| 2,130,162 | Thompson | Sept. 13, 1938 |
| 2,259,873 | Baumgartner | Oct. 21, 1941 |
| 3,012,202 | Waters | Dec. 5, 1961 |